United States Patent
Yamashita et al.

(10) Patent No.: US 10,511,212 B2
(45) Date of Patent: Dec. 17, 2019

(54) INNER ROTOR-TYPE PERMANENT MAGNET MOTOR WITH ANNULAR MAGNETIC POLES

(71) Applicant: MINEBEA MITSUMI Inc., Nagano (JP)

(72) Inventors: Fumitoshi Yamashita, Kitasaku-gun (JP); Osamu Yamada, Kitasaku-gun (JP); Shiho Ohya, Kitasaku-gun (JP); Akihiro Yamane, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 129 days.

(21) Appl. No.: 15/891,916

(22) Filed: Feb. 8, 2018

(65) Prior Publication Data

US 2018/0159407 A1 Jun. 7, 2018

Related U.S. Application Data

(63) Continuation-in-part of application No. 14/935,932, filed on Nov. 9, 2015, now abandoned, which is a
(Continued)

(30) Foreign Application Priority Data

Oct. 7, 2011 (JP) ................................ 2011-222924

(51) Int. Cl.
*H02K 15/03* (2006.01)
*H02K 1/27* (2006.01)
(Continued)

(52) U.S. Cl.
CPC ............. *H02K 15/03* (2013.01); *H02K 1/278* (2013.01); *H02K 1/02* (2013.01); *H02K 29/03* (2013.01);
(Continued)

(58) Field of Classification Search
CPC ........ H02K 15/03; H02K 15/02; H02K 1/278; H02K 1/02; H02K 1/27; H02K 1/2706;
(Continued)

(56) References Cited

U.S. PATENT DOCUMENTS 6,784,582 B1 * 8/2004 Kolomeitsev ........ H02K 1/2733
310/156.01
7,902,707 B2 3/2011 Kawamura et al.
(Continued)

FOREIGN PATENT DOCUMENTS

JP H06-217478 A 8/1994
JP 2001-275285 A 10/2001
(Continued)

OTHER PUBLICATIONS

Machine translation of JP 2001275285 A (Oct. 2001). (Year: 2001).*
(Continued)

*Primary Examiner* — Michael Andrews
(74) *Attorney, Agent, or Firm* — Pearne & Gordon LLP

(57) ABSTRACT

A motor includes poles P having a remanence Mr of 0.9 T or more, a coercivity HcJ of 0.80 MA/m or more, and a maximum energy product $(BH)_{max}$ of 150 kJ/m³ or more, which sets a center point Pc of the magnetic poles in a circumferential direction on a rotor outer circumferential surface to a maximum thickness $t_{max}$, wherein when a line connecting the Pc and a rotational axis center Rc is Pc-Rc, a straight line connecting an arbitrary point Px in the circumferential direction on the rotor outer circumferential surface and the Rc is Px-Rc, an apex angle of the lines Pc-Rc and Px-Rc is θ, a number of pole pairs is Pn, a circumferential direction magnetic pole end is Pe, and a magnetic pole end biasing distance $\Delta L_{Pe}$ of the circumferential direction magnetic pole ends Pe is $\alpha \times t_{max}$ (α is a coefficient).

3 Claims, 6 Drawing Sheets

Related U.S. Application Data continuation of application No. 13/648,073, filed on Oct. 9, 2012, now abandoned.

(51) Int. Cl.
   *H02K 1/02* (2006.01)
   *H02K 29/03* (2006.01)

(52) U.S. Cl.
   CPC ..... *H02K 2201/03* (2013.01); *H02K 2213/03* (2013.01)

(58) Field of Classification Search
   CPC ...... H02K 1/272; H02K 1/274; H02K 1/2753; H02K 29/03; H02K 2201/03; H02K 2213/03
   USPC ............ 29/598; 310/156.36, 156.38–156.39, 310/156.43–156.46
   See application file for complete search history.

(56) References Cited

U.S. PATENT DOCUMENTS

| | | | |
|---|---|---|---|
| 2002/0067096 A1 | 6/2002 | Yamamoto et al. | |
| 2009/0140590 A1* | 6/2009 | Hung | H02K 1/276 310/156.32 |
| 2009/0251023 A1 | 10/2009 | Nakano et al. | |
| 2010/0109468 A1* | 5/2010 | Natsumeda | H02K 1/02 310/156.43 |
| 2010/0218365 A1* | 9/2010 | Yamashita | H01F 41/028 29/604 |

FOREIGN PATENT DOCUMENTS

| | | | | |
|---|---|---|---|---|
| JP | 2001275285 A | * | 10/2001 | ............... H02K 1/27 |
| JP | 2003-230240 A | | 8/2003 | |
| JP | 2005-116936 A | | 4/2005 | |
| WO | 2005/124795 A1 | | 12/2005 | |

OTHER PUBLICATIONS

Pang et al. "Comparison of Brushless Motors Having Halbach Magnetized Magnets and Shaped Parallel Magnetized Magnets", Proc. of the 18th International Workshop on High Performance Magnets and Their Applications, 2004, pp. 400-407. (Year: 2004).*

Pang et al., "Comparision of Brushless Motors Having Halbach Magnetized Magnets and Shapred Parallel Magnetized Magnets", Proc. of the 18th International Workshop on High Performance Magnets and Their Applications, 2004, pp. 400-407.

Rodewald et al. "Properties and Applications of High Performance Magnets", Proc. of the 18th Interntional Workshop on High Performance Magnets and Their Applications, 2004, pp. 52-63 (Cited in earlier U.S. Appl. No. 13/648,073).

Schulze. "Application of High Performance Magnets in Small Motors", Proc. of the 18th International Workshop on High Performance Magnets and Their Applications, 2004, pp. 908-915 (Cited in earlier U.S. Appl. No. 13/648,073).

* cited by examiner

| θ (degree) | X (mm) | Y (mm) | θ (degree) | X (mm) | Y (mm) | θ (degree) | X (mm) | Y (mm) |
|---|---|---|---|---|---|---|---|---|
| 0 | 8.000 | 0.000 | 15 | 7.652 | 1.876 | 30 | 6.654 | 3.625 |
| 1 | 7.998 | 0.127 | 16 | 7.605 | 1.998 | 31 | 6.567 | 3.734 |
| 2 | 7.994 | 0.253 | 17 | 7.555 | 2.120 | 32 | 6.477 | 3.842 |
| 3 | 7.986 | 0.379 | 18 | 7.502 | 2.240 | 33 | 6.385 | 3.949 |
| 4 | 7.975 | 0.506 | 19 | 7.446 | 2.360 | 34 | 6.291 | 4.054 |
| 5 | 7.961 | 0.632 | 20 | 7.387 | 2.480 | 35 | 6.195 | 4.158 |
| 6 | 7.944 | 0.758 | 21 | 7.326 | 2.598 | 36 | 6.097 | 4.261 |
| 7 | 7.924 | 0.884 | 22 | 7.262 | 2.716 | 37 | 5.997 | 4.363 |
| 8 | 7.900 | 1.009 | 23 | 7.195 | 2.833 | 38 | 5.895 | 4.464 |
| 9 | 7.874 | 1.134 | 24 | 7.125 | 2.949 | 39 | 5.790 | 4.563 |
| 10 | 7.845 | 1.259 | 25 | 7.053 | 3.064 | 40 | 5.684 | 4.660 |
| 11 | 7.812 | 1.383 | 26 | 6.978 | 3.178 | 41 | 5.576 | 4.756 |
| 12 | 7.777 | 1.507 | 27 | 6.901 | 3.291 | 42 | 5.466 | 4.851 |
| 13 | 7.738 | 1.631 | 28 | 6.821 | 3.404 | 43 | 5.355 | 4.944 |
| 14 | 7.697 | 1.754 | 29 | 6.738 | 3.515 | 44 | 5.241 | 5.036 |
|  |  |  |  |  |  | 45 | 5.127 | 5.127 |

INNER ROTOR-TYPE PERMANENT MAGNET MOTOR WITH ANNULAR MAGNETIC POLES

This Application is a Continuation-in-Part Application of U.S. patent application Ser. No. 14/935,932, filed on Nov. 9, 2015, which is a Continuation Application of U.S. patent application Ser. No. 13/648,073, filed Oct. 9, 2012, which claims the benefit of priority of Japanese Patent Application No. 2011-222924, filed on Oct. 7, 2011.

BACKGROUND OF THE INVENTION

1. Field of the Invention

The present invention relates to an inner rotor-type permanent magnet motor which installs parallel oriented annular magnetic poles. More specifically, the present invention relates to a technology which responds to the need for electric power saving, resource saving, miniaturization, and noise reduction in inner rotor-type permanent magnet motors of approximately 50 W or less, by providing parallel oriented annular magnetic poles having a maximum energy product $(BH)_{max}$ of 150 kJ/m³ or more, which the magnetic characteristics do not deteriorate even upon reducing the tube diameter and a waveform distortion rate of back-EMF (electromotive force) and cogging torque are minimized.

2. Description of the Related Art

When the specifications of motor structure, materials, dimensions, and the like are fixed, an inner rotor-type permanent magnet motor having slots for accommodating windings in a stator core has a feature that the relationship between a remanence Mr and a motor constant $K_J$ of a magnet on the rotor surface is $Mr \propto a \times K_J$ (wherein a is a coefficient) over a wide range compared to other motor structures [refer to J. Schulze, "Application of high performance magnets for small motors", Proc. of the 18$^{th}$ International Workshop on High Performance Magnets and Their Applications, pp. 908-915 (2004)]. Therefore, in the motor structure which is an object of the present invention, it is easy to improve the rotational performance associated with the motor constant $K_J$ by enhancing the maximum energy product $(BH)_{max}$ of the magnet used as magnetic poles which generate a static magnetic field.

However, when utilizing a high $(BH)_{max}$ magnet, in the inner rotor-type permanent magnet motor which is an object of the present invention, a high rotational performance can be obtained, but on the other hand, slots which accommodate windings and teeth which form a portion of a magnetic circuit exist in the stator core of the motor. Therefore, the permeance changes in accordance with the rotation. Thus, increasing the $(BH)_{max}$ of the magnet leads to increases in the torque pulsation, or in other words the cogging torque. An increase in the cogging torque interferes with smooth rotation of the motor, increases rotational vibration and noise, and also leads to worsening of the controllability.

In order to avoid the ill effects on rotation of an inner rotor-type permanent magnet motor as described above, numerous innovations and proposals for cogging torque reduction have been conventionally reported.

For example, a method for skewing the annular magnetic poles whose maximum thickness $t_{max}$ is approximately 1.0 to 1.5 mm [for example, refer to W. Rodewald, M. Katter "Properties and applications of high performance magnets", Proc. of the 18$^{th}$ International Workshop on High Performance Magnets and Their Applications, pp. 52-63 (2004) (hereinafter referred to as "Rodewald Reference")], and a method for controlling the anisotropy of the annular magnetic poles in a continuous direction [for example, refer to United States Patent Application Publication No. 2010/0218365 (hereinafter referred to as "No. 2010/0218365")] are known.

SUMMARY OF THE INVENTION

In an inner rotor-type permanent magnet motor (SPMSM: surface permanent magnet synchronous motor) as disclosed in the Rodewald Reference, when skewing the magnetic poles, the back-EMF (electromotive force) is generally reduced by about 10 to 15% compared to a non-skewed magnetic poles of the same shape and same material. In addition, when adhesively fixing the magnetic poles to a rotor core, there are cases that the magnetic poles become displaced in the circumferential direction. Such displacement in the circumferential direction and steps in the radial direction can lead to insufficient assembly precision of the magnetic poles. If skewed magnetic poles are assembled individually to the rotor core, the assembly precision drops, and by extension, it becomes difficult to stably reduce the cogging torque.

In response to the problem related to assembly precision of the magnetic poles described above, referring to the annular magnetic poles whose anisotropy is controlled in a continuous direction in No. 2010/0218365, deformed magnetic poles having a thickness of, for example, 1.5 mm are first prepared as shown in FIG. 6A such that the orientation of anisotropy continuously changes from a vertical direction to an in-plane direction on the magnetic pole surface by a uniform external magnetic field Hex. Next, as shown in FIG. 6B, an even number of the deformed magnetic poles corresponding to the number of pole pairs is arranged on the circumference of a circle, and a segment is extruded in a ring-shape using rheology based on viscous deformation of the segment from one axial direction end surface of the deformed magnetic poles. Finally, the segment is compressed from both axial direction end surfaces of the ring to yield a ring magnet whose anisotropy is controlled in a continuous direction.

As described above, No. 2010/0218365 discloses a ring magnet whose magnetic pole ends Pe in the circumferential direction are all integrated to each other, for example, whose outer diameter is 50.3 mm. In this method, reduction in the back-EMF is inhibited, and compared to a case that an even number of skewed magnetic poles is individually assembled to the rotor core, the individual magnetic poles do not become displaced in the circumferential direction or the radial direction when assembling the rotor core due to the ring shape. Therefore, assembly precision can be secured and cogging torque can be stably reduced. Thereby, compared to parallel oriented magnetic poles, the noise can be reduced by a maximum of 10 dB(A) in the example of an SPMSM (inner rotor type permanent magnet motor) with an output of 40 W.

As described above, the technology disclosed in No. 2010/0218365 has a structure as shown in FIGS. 6A and 6B and is suitable for maintaining the back-EMF standard and reducing the waveform distortion rate of the back-EMF and the cogging torque in an SPMSM utilizing a ring magnet which has a large tube diameter and is relatively thin with a magnet thickness of 1.5 mm and an outer diameter of 50.3 mm. However, in order to reliably achieve such effects, magnetic poles in which the orientation of the anisotropy continuously changes appropriately as shown in FIG. 6A must be prepared, regardless of the pole number, slot number, teeth width, and the like based on the design concept of the SPMSM as disclosed in U.S. Pat. No. 7,902,707. However, as described in Y. Pang, Z. Q. Zhu, S. Ruangsinchaiwanich, D. Howe, "Comparison of brushless motors having halbach magnetized magnets and shaped parallel magnetized magnets", Proc. of the 18th International Workshop on High Performance Magnets and Their Applications, pp. 400-407 (2004) (hereinafter referred to as "Pang Reference"), if the thickness of the magnetic poles is not 1.5 mm but is increased to, for example, 3 mm, or the outer diameter is, for example, 10 mm or less so that the magnetic pole width is the same but the thickness is increased or the thickness is the same but the magnetic pole width (circumferential direction) is decreased, a cross-section shape in which the orientation of the anisotropy continuously changes appropriately as disclosed in U.S. Pat. No. 7,902,707 cannot be obtained, and as a result, constraints in the outer diameter of the magnetic poles, the magnetic pole width, the teeth width, and the like must be satisfied.

In response to the above, a 12-pole 18-slot SPMSM (inner rotor-type permanent magnet motor) with so-called eccentric annular magnetic poles is prepared so that the minimum thickness of the magnetic pole ends in the circumferential direction on the outer circumferential surface is 1.5 mm when the maximum thickness at the center in the circumferential direction of the annular magnetic poles which are radially oriented in the circumferential direction is, for example, 3 mm. Thereby, the cogging torque can be reduced due to eccentricity of the annular magnetic poles (for example, refer to the Pang Reference). Referring to FIG. 7, eccentric as used herein means moving the center of an outer radius R22 by an eccentricity amount E on line Pc-Rc in annular magnetic poles whose rotation axis center is Rc, inner radius is R1, outer radius is R2, and magnetic pole center in the circumferential direction on the outer circumferential surface is Pc. However, since Pc does not move, the maximum thickness $t_{max}$ is the same. Further, the circumferential direction magnetic pole ends Pe decrease further than $t_{max}$ in accordance with the eccentricity amount E.

Regarding the eccentricity amount E of the magnetic poles in the SPMSM (inner rotor-type permanent magnet motor) described above, it has been disclosed that if, for example, the average gap length is $G_{avg}$ mm when the magnetic poles are eccentric, the gap length is $G_{avg}$ mm when the eccentricity amount E of the magnetic poles is 0, and the magnetic pole thickness is t(0) mm when the eccentricity amount E is 0, the maximum thickness $t_{max}$ of the magnetic pole center in the circumferential direction is within a range of $(G_{avg}/G_{min}) \times t(0) + (G_{avg} - G_{min}) \times (1 \pm 0.1)$ (refer to Japanese Patent Application Laid-Open (JP-A) No. 2001-275285). In other words, in FIG. 7, the eccentricity amount E of a circular arc radius R22 on the outer circumferential surface of the magnetic poles relative to the rotational axis center Rc is set to 0.3 to 0.6.

Meanwhile, regarding an SPMSM (inner rotor-type permanent magnet motor) using magnetic poles oriented in parallel, it has been disclosed that an interval A between adjacent magnetic poles is set to R2×2×b/Pn (wherein Pn is the number of pole pairs and b is a coefficient such that 0<b≤0.2), and a biasing amount of the magnetic pole ends Pe is set to R2×2×c/Pn (wherein Pn is the number of pole pairs and c is a coefficient such that 0.02≤c≤0.5) (refer to Japanese Patent Application Laid-Open (JP-A) No. 2003-230240).

As described above, regarding the eccentricity of the magnetic poles in an SPMSM (inner rotor-type permanent magnet motor), the shape in the circumferential direction is generally determined by the eccentricity amount E as shown in FIG. 7. However, as described in JP-A No. 2001-275285, since the curvature R22 of the outer circumferential surface is a fixed value, there is a limit to how much the waveform of the back-EMF can approach a sinusoidal wave, and thus the harmonic wave component other than the basic wave component of the cogging torque cannot be sufficiently reduced overall. In addition, JP-A No. 2003-230240 describes a structure for setting the interval A between adjacent magnetic poles. Therefore, when assembling to the rotor core, there is displacement of the magnetic poles in the circumferential direction, and thus it is difficult to stably reduce the cogging torque.

The present invention has been made in consideration of the above problems, and the present invention renders the back-EMF waveform into a sinusoidal wave shape by minimizing the back-EMF waveform distortion rate τ, and as a result the harmonic wave component other than the basic wave component of the cogging torque is reduced overall. Further, since the reduction in the back-EMF constant Ke does not exceed the reduction in the cross-section area of the magnetic poles, smooth rotation of an inner rotor-type permanent magnet motor, such as an SPMSM which installs an isotropic $Nd_2Fe_{14}B$-type magnet subjected to sinusoidal wave magnetization, is maintained and the rotational performance is enhanced by increasing the $(BH)_{max}$ of the magnet which constitutes the magnetic poles.

The present invention relates to an inner rotor-type permanent magnet motor which installs high $(BH)_{max}$ annular magnetic poles. More specifically, the present invention relates to parallel oriented annular magnetic poles having a maximum energy product $(BH)_{max}$ of 150 kJ/m³ or more, where the magnetic characteristics do not deteriorate even upon reducing the tube diameter and a waveform distortion rate τ of the back-EMF and cogging torque Tcg are minimized. However, in the present invention, the thickness in the radial direction is not determined by the eccentricity amount E and the curvature R22 of the outer circumferential surface is not a fixed value as shown in FIG. 7.

The embodiments of the invention described below are examples of the structure of the present invention. In order to facilitate the understanding of the various structures of the present invention, the explanations below are divided into aspects. Each aspect does not limit the technical scope of the present invention, and the technical scope of the present invention can also include structures where a portion of the components in the aspects below are substituted or deleted, or another component is added upon referring to the best modes for carrying out the invention.

In order to facilitate the understanding of each aspect, the explanations below will refer to FIG. 1. FIG. 1 is an axial direction cross-section view which specifies the outer circumferential shape of the annular magnetic poles according to an embodiment of the present invention, but the present invention is not limited to only the specific embodiment shown in FIG. 1.

According to a first aspect of the present invention, there is provided a manufacturing method of an inner rotor-type permanent magnet motor, comprising: providing a plurality of parallel oriented annular magnetic poles P each having: a remanence Mr of 0.9 T or more, a coercivity HcJ of 0.80 MA/m or more, a maximum energy product (BH)max of 150 kJ/m³ or more, a center point Pc along a direction configured to be a circumferential direction of a rotor outer circumferential surface, and a maximum thickness $t_{max}$ at center point Pc, wherein when a straight line connecting the center point Pc and a rotational axis center Rc is Pc-Rc, a circumferential direction magnetic pole end of the rotor outer circumferential surface is P'e, an arbitrary point in the circumferential direction is Px, the arbitrary point Px being on a line extending from the pole end Pe non-eccentrically drawn relative to the rotational axis center Rc, a straight line connecting the arbitrary point Px and the rotational axis center Rc is Px-Rc, an apex angle of the straight lines Pc-Rc and Px-Rc is θ, a number of pole pairs is Pn, a position on the rotor outer circumferential surface extending from the arbitrary point Px parallel to the straight line Pc-Rc is P'x, a circumferential direction magnetic pole end is Pe, the pole end Pe being on a line extending from the center point Pc non-eccentrically drawn relative to the rotational axis center Rc, and a magnetic pole end biasing distance $\Delta L_{pe}$ defined between the pole end Pe and the pole end P'e is $\alpha \times t_{max}$ (α is a coefficient): α is 0.25±0.03, and a magnetic pole end biasing distance $\Delta L_{px}$ defined between the position P'x and the point Px on the straight line Px-Rc relative to the apex angle θ is $\Delta L_{pe} \times \cos(\theta \times Pn)$, each of the parallel oriented annular magnetic poles P being formed in a state of being orthogonal to a direction of a uniform external magnetic field Hex; arranging each of the magnetic poles P uniformly in a first circumferential direction in accordance with a number of pole pairs Pn; transferring each of the magnetic poles P into an annular cavity while heating from one axial direction end surface; recompressing each of the magnetic poles P so as to combine each circumferential direction magnetic pole end Pe of the magnetic poles P with each other to form a ring-shaped parallel orientated annular magnetic pole Pr; inserting the ring-shaped parallel orientated annular magnetic pole Pr into a core with a rotation shaft; and adhesively fixing the ring-shaped parallel orientated annular magnetic pole Pr to the core to form an inner rotor.

First, the eccentricity of the magnetic poles according to this aspect of the invention will be explained referring to FIG. 1 which illustrates the axial direction cross-section shape of the magnetic poles for convenience. In FIG. 1, Rc is a rotational axis center, R1 is an inner radius of the annular magnetic poles, R2 is a maximum outer radius of the annular magnetic poles, R3 is a minimum outer radius of the annular magnetic poles, Pc is a center point of the magnetic poles on the outer circumferential surface, $t_{max}$ is a maximum thickness of the magnetic poles at Pc, Pe is a non-eccentric magnetic pole end on the outer circumferential surface, $\Delta L_{pe}$ is a biasing distance from the magnetic pole ends Pe, P'e is a magnetic pole end on the outer circumferential surface according to this aspect of the invention, Px is an arbitrary position on the outer circumferential surface of a rotor where the outer circumferential surface of the rotor is non-eccentrically drawn from the R3 of the magnetic pole end P'e, P'x is a position on the rotor outer circumferential surface extending from the arbitrary point Px parallel to a straight line Pc-Rc, $\Delta L_p x$ is a magnetic pole biasing distance defined between Px and P'x, and θ is an apex angle of an intersection point of straight line Pc-Rc and straight line Px-Rc.

The invention according to this aspect relates to a manufacturing method of an inner rotor-type permanent magnet motor including parallel oriented annular magnetic poles P shown in FIG. 1 having a remanence Mr of 0.9 T or more, a coercivity HcJ of 0.80 MA/m or more, and a (BH)max of 150 kJ/m³ or more, which sets the center point Pc of the magnetic poles in the circumferential direction on the outer circumferential surface to a maximum thickness $t_{max}$, wherein when a straight line connecting the center point Pc of the magnetic poles on the outer circumferential surface and the rotational axis center Rc is Pc-Rc, a straight line connecting the an arbitrary point Px in the circumferential direction on the outer circumferential surface and Rc where the outer circumferential surface of the rotor is non-eccentrically drawn from the R3 of the magnetic pole end P'e is Px-Rc, an apex angle of the straight lines Pc-Rc and Px-Rc is θ, the number of pole pairs is Pn, and the magnetic pole end biasing distance $\Delta L_p e$ defined between the magnetic pole ends Pe and the magnetic pole end P'e is a X $t_{max}$ (α is a coefficient), a is in the range of 0.25±0.03, a magnetic pole end biasing distance $\Delta L_{px}$ defined between a position P'x and an arbitrary point Px on line Px-Rc relative to the apex angle θ is $\Delta L_{pe} \times \cos(\theta \times Pn)$. The invention further includes the manufacturing methods of: each of the parallel oriented annular magnetic poles P being formed in a state of being orthogonal to a direction of a uniform external magnetic field Hex; arranging each of the magnetic poles P uniformly in a first circumferential direction in accordance with a number of pole pairs Pn; transferring each of the magnetic poles P into an annular cavity while heating from one axial direction end surface; recompressing each of the magnetic poles P so as to combine each circumferential direction magnetic pole end P'e of the magnetic poles P with each other to form a ring-shaped parallel orientated annular magnetic pole Pr; inserting the ring-shaped parallel orientated annular magnetic pole Pr into a core with a rotation shaft; and adhesively fixing the ring-shaped parallel orientated annular magnetic pole Pr to the core to form an inner rotor. Thereby, in an inner rotor-type permanent magnet motor which installs circular arc-shaped magnetic poles oriented in parallel, the cogging torque and the basic wave component as well as the harmonic wave component of the back-EMF waveform distortion rate τ can be minimized overall.

Meanwhile, by mutually integrating the circumferential direction magnetic pole ends P'e of the parallel oriented annular magnetic poles P having a remanence Mr of 0.9 T or more, a coercivity HcJ of 0.80 MA/m or more, and a maximum energy product (BH)max of 150 kJ/m³ or more, displacement of the magnetic poles in the circumferential direction can be prevented and the reduction of the cogging torque Tcg and the back-EMF waveform distortion rate τ can be stabilized.

In the inner rotor-type permanent magnet motor according to the first aspect, the straight line Pc-Rc which connects the center point Pc of the magnetic poles in the circumferential direction on an inner rotor outer circumferential surface and the rotational axis center Rc is 25 mm or less.

With this structure, by making the line Pc-Rc which connects the center point Pc of the magnetic poles in the circumferential direction on the outer circumferential surface of the inner rotor and the rotational axis center Rc 25 mm or less, the present invention provides ring-shaped magnetic poles having a small tube diameter, thereby overcoming the conventional difficulty in achieving ring-shaped magnetic poles which are sufficiently oriented in a radially oriented magnetic field by a repulsive magnetic field. Thereby, the present invention is more effective regarding power conservation, resource conservation, size reduction, and noise reduction in an inner rotor-type permanent magnetic motor which has a small tube diameter.

With the structures described above, the present invention can render the back-EMF waveform into a sinusoidal wave shape by minimizing the back-EMF waveform distortion rate τ, and as a result the harmonic wave component other than the basic wave component of the cogging torque can be reduced overall. Further, since the reduction in the back- EMF constant Ke does not exceed the reduction in the cross-section area of the magnetic poles, smooth rotation of an inner rotor-type permanent magnet motor, such as an SPMSM which installs an isotropic $Nd_2Fe_{14}B$-type magnet subjected to sinusoidal wave magnetization, can be maintained and the rotational performance can be enhanced by increasing the $(BH)_{max}$ of the magnet which constitutes the magnetic poles. Therefore, the present invention can respond to the need for power conservation, resource conservation, size reduction, and noise reduction in inner rotor-type permanent magnet motors of approximately 50 W or less.

DETAILED DESCRIPTION OF THE PREFERRED EMBODIMENTS

Figures 1, 2:
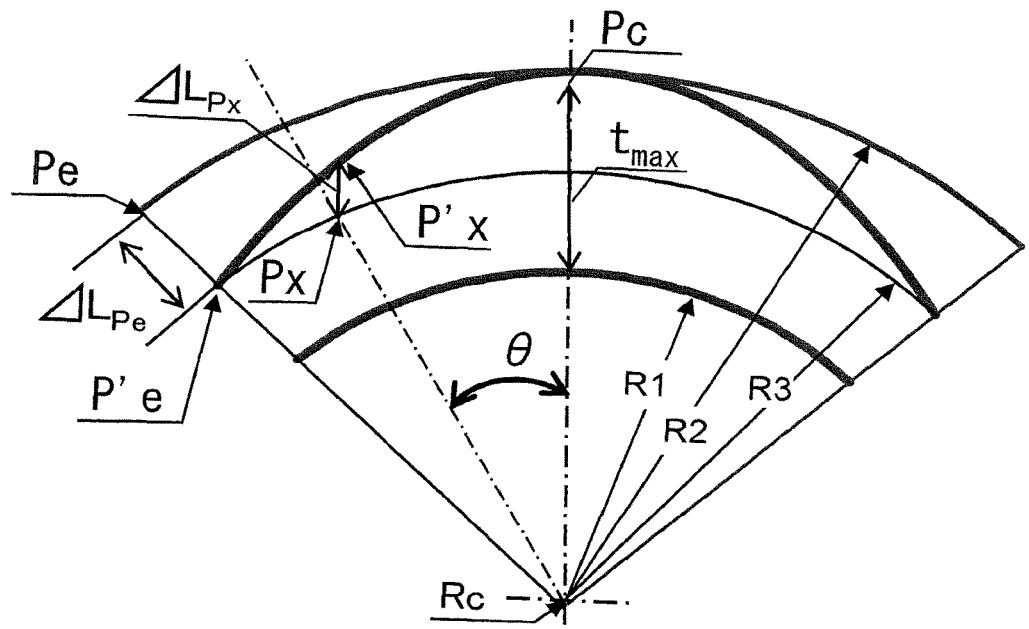
FIG. 1 is a cross-section view in a direction orthogonal to the axial direction which specifies an outer circumferential shape of annular magnetic poles according to an embodiment of the present invention.
FIG. 2 is a chart illustrating the relationship between an apex angle θ and coordinates of a point P'x shown in FIG. 1.

The present invention will be explained in more detail below. First, in FIG. 1, when the inner radius R1 of the annular magnetic poles from the rotational axis center Rc is 5 mm, the maximum outer radius R2 is 8 mm, and the number of pole pairs Pn is 2, the magnetic pole maximum thickness $t_{max}$ at the magnetic pole center Pc in the circumferential direction on the outer circumferential surface is 3 mm. In this case, if α is, for example, 0.25, or in other words if the magnetic pole biasing distance $\Delta L_{pe}$ of the magnetic pole ends Pe is $0.25 \times t_{max}$, the magnetic pole biasing distance $\Delta L_p x$ of an arbitrary point Px on line Px-Rc relative to the apex angle θ is found from $\Delta L_{pe} \times \cos(\theta \times Pn)$. The chart in FIG. 2 illustrates the coordinate values of the position P'x on the outer circumferential surface extending from the arbitrary point Px parallel to the straight line Pc-Rc relative to the apex angle θ when the rotational axis center Rc is the point of origin. As shown in the chart in FIG. 2, the coordinates of the position P'x relative to the apex angle θ when the rotational axis center Rc is the point of origin exhibit bilateral symmetry on the magnetic pole center Pc, and the inner radius R1 becomes annular magnetic poles having a fixed curvature.

Figure 3A:
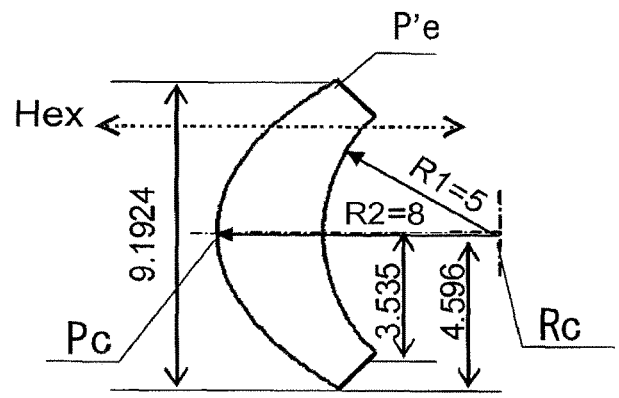
FIG. 3A a cross-section view in a direction orthogonal to the axial direction of annular magnetic poles having a specified outer circumferential shape according to an embodiment of the present invention.

The annular magnetic poles oriented in parallel according to the present invention as described above are formed in a state that they are orthogonal to a direction of a uniform external magnetic field Hex shown by the arrow mark in FIG. 3A using a cavity which has the cross-section shape shown in FIG. 3A. As a method of formation, the widely-known methods of injection or extrusion may be used. However, in order to further improve the rotational performance of the inner rotor-type permanent magnet motor, it is preferable to form the magnetic poles so that the $(BH)_{max}$ is 150 kJ/m³ or more, and thus a compression method in an orthogonal magnetic field is preferable.

Figure 3B:
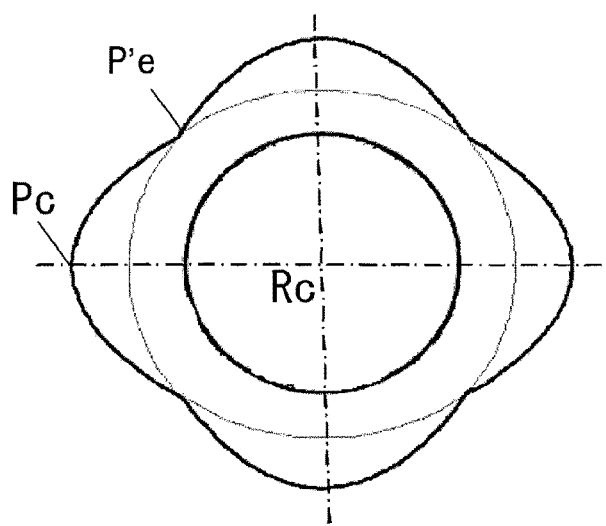
FIG. 3B is a cross-section view in a direction orthogonal to the axial direction of a ring magnet according to the embodiment of the present invention.

As shown in FIG. 3B, it is preferable to integrate the parallel oriented annular magnetic poles prepared as shown in FIG. 3A into a ring shape in a front stage where the annular magnetic poles are uniformly arranged in the circumferential direction in accordance with the number of pole pairs Pn, transferred into an annular cavity while heating from one axial direction end surface, and recompressed, and then all of the circumferential direction magnetic pole ends are combined with a rotor core or the like. Annular as used in the present invention also includes ring-shaped, cylinder-shaped, circular arc-shaped, and hollow circular disc-shaped. For example, when combining with a rotor core, the magnetic poles may be configured in a ring shape.

When the straight line Pc-Rc which connects the center point Pc of the magnetic poles in the circumferential direction on the outer circumferential surface of the inner rotor and the rotational axis center Rc is 25 mm or less, the present invention becomes more effective regarding power conservation, resource conservation, size reduction, and noise reduction in an inner rotor-type permanent magnet motor having a small tube diameter, thereby overcoming the normal difficulty in achieving ring-shaped magnetic poles which are sufficiently oriented in a radially oriented magnetic field where the orientation magnetic field has been repulsed.

Embodiments

Hereinafter, embodiments regarding minimizing the cogging torque and the back-EMF in an inner rotor-type permanent magnet motor made from annular magnetic poles where the number of pole pairs Pn is 2 according to the present invention will be explained in more detail. However, the present invention is not limited to the following embodiments.

A material composition of the magnet according to the present embodiment is as follows (the units in the following are vol. %): 32.1 of an anisotropic $Sm_2Fe_{17}N_3$-type fine powder having a grain diameter of 3 to 5 μm and a $(BH)_{max}$ of 290 kJ/m³, 48.9 of anisotropic $Nd_2Fe_{14}B$-type particles having a grain diameter of 38 to 150 μm and a $(BH)_{max}$ of 270 kJ/m³, 6.2 of a novolac-type epoxy oligomer, 9.1 of linear polyamide, 1.8 of 2-phenyl-4,5-dihidroxy methyl imidazole, and 1.9 of a lubricant (pentaerythritol stearic acid triester).

The magnet in the present embodiment as described above has the following characteristics: a remanence Mr of 0.95 T in a measured magnetic field of ±2.4 MA/m, a coercivity HcJ of 0.95 MA/m, and a $(BH)_{max}$ of 160 kJ/m³.

First, annular magnetic poles P were prepared at 50 MPa having an inner radius R1 of 5 mm, an outer radius R2 of 8 mm, and a mechanical degree of 90° as shown in FIG. 3A in a uniform orientation magnetic field Hex of 1.4 MA/m. The magnetic pole biasing distance $\Delta L_{Pe}$ of the magnetic pole ends Pe of the annular magnetic poles P was in a range from $0 \times t_{max}$ to $0.67 \times t_{max}$, and the magnetic pole biasing distance $\Delta L_{Px}$ of the point Px on the line Px-Rc relative to θ was $\Delta L_{Pe} \times \cos(\theta \times Pn)$ (for example, refer to FIG. 2).

Next, four magnetic poles prepared as described above were arranged in the circumferential direction in a die, compressed at 500 kPa and 150° C., and then released from the die, to yield a ring where the circumferential direction magnetic pole ends P'e of the annular magnetic poles P are mutually integrated. Further, the ring was inserted into a core including a rotation shaft having an outer diameter of 10 mm and adhesively fixed to form an inner rotor. Then, by combining with a stator, a 4-pole 6-slot SPMSM (inner rotor-type permanent magnet) which is the present invention as well as a comparative embodiment was obtained. The stator core teeth width was 4 mm or 6 mm. Meanwhile, quenched flakes of a molten alloy near $Nd_2Fe_{14}B$ stoichiometry were hardened together with a resin into a ring having an inner radius R1 of 5 mm and an outer radius R2 of 8 mm, and subjected to sinusoidal wave magnetization with a number of pole pairs Pn of 2 on the outer circumferential surface to yield a conventional embodiment having a $(BH)_{max}$ of 80 kJ/m³.

Figure 4A:
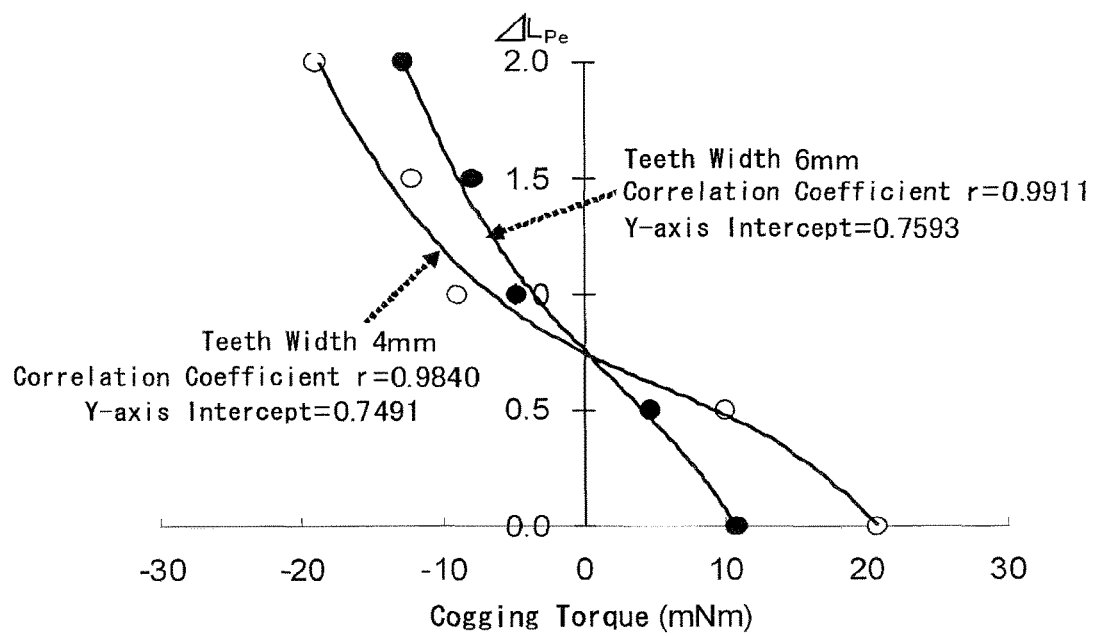
FIG. 4A is a characteristics graph illustrating the relationship between a cogging torque and a magnetic pole biasing distance $\Delta L_{Pe}$.

FIG. 4A illustrates the relationship between the cogging torque and the magnetic pole biasing distance $\Delta L_{Pe}$ of the 4-pole 6-slot SPMSM (inner rotor-type permanent magnet motor). First, a stator core tooth width of 4 mm where a portion is magnetically saturated exhibited higher cogging torque values than a width of 6 mm. However, the $\Delta L_{Pe}$ relative to the cogging torque was similar in a tertiary method in either case. The Y-axis intercept ($\Delta L_{Pe}$) was approximately 0.75 mm regardless of the teeth width when the phase of the torque curve changes, and when the $t_{max}$ was 3 mm and $\Delta L_{Pe}$ was 0.75 mm as in the present embodiment, the coefficient α was 0.25.

Figure 4B:
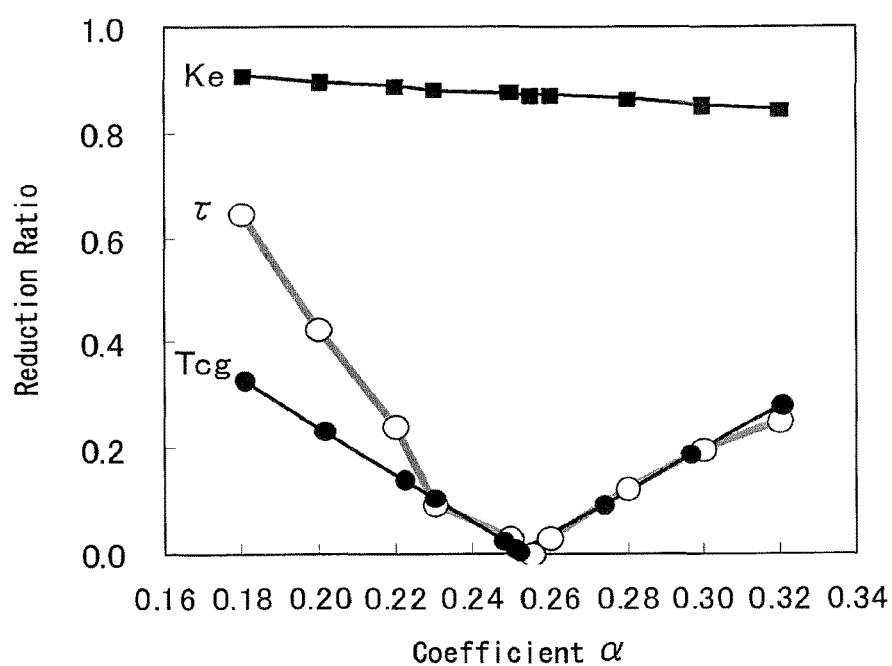
FIG. 4B is a characteristics graph illustrating the relationship of a coefficient α with a cogging torque Tcg, a back-EMF waveform distortion rate τ, and a back-EMF constant Ke.

FIG. 4B illustrates the relationship of α with the cogging torque Tcg, the back-EMF waveform distortion rate τ, and the back-EMF constant Ke when the coefficient α is near 0.25. A reduction ratio used herein means a ratio with α=0 (non-eccentric magnetic poles), and when α=0 (non-eccentric magnetic poles), Tcg was 5.93 mNm, τ was 9.753%, and Ke was 15.96 mVs/rad. The cogging torque is a ratio of an absolute value.

As is clear from FIG. 4B, the reduction ratios of the cogging torque Tcg and the back-EMF waveform distortion rate τ reach a minimum when the coefficient α is near approximately 0.25. If the coefficient α is 0.25±0.03 as in the present invention, the cogging torque Tcg can be minimized up to 0.14 (1.5 mNm) or less in a ratio with α=0 (non-eccentric magnetic poles). This is because the waveform can be rendered into a sinusoidal wave shape by minimizing the back-EMF waveform distortion rate τ. As a result, the harmonic wave component other than the basic wave component of the cogging torque is reduced overall.

In the conventional embodiment, 4-pole 6-slot SPMSM (inner rotor-type permanent magnet motor) which installs a ring having a $(BH)_{max}$ of 80 kJ/m³ which has been subjected to sinusoidal wave magnetization, the cogging torque Tcg was 1.13 mNm, the back-EMF waveform distortion rate τ was 2.03%, and the back-EMF constant Ke was 10.58 mVs/rad. In other words, if the coefficient α is 0.25±0.03 as in the present invention, the cogging torque and the back-EMF waveform distortion rate τ are equivalent to or less than those in the 4-pole 6-slot SPMSM (inner rotor-type permanent magnet motor) which installs a ring having a $(BH)_{max}$ of 80 kJ/m³ which has been subjected to sinusoidal wave magnetization, and the back-EMF constant Ke is 1.3 times or more higher.

Figure 5:
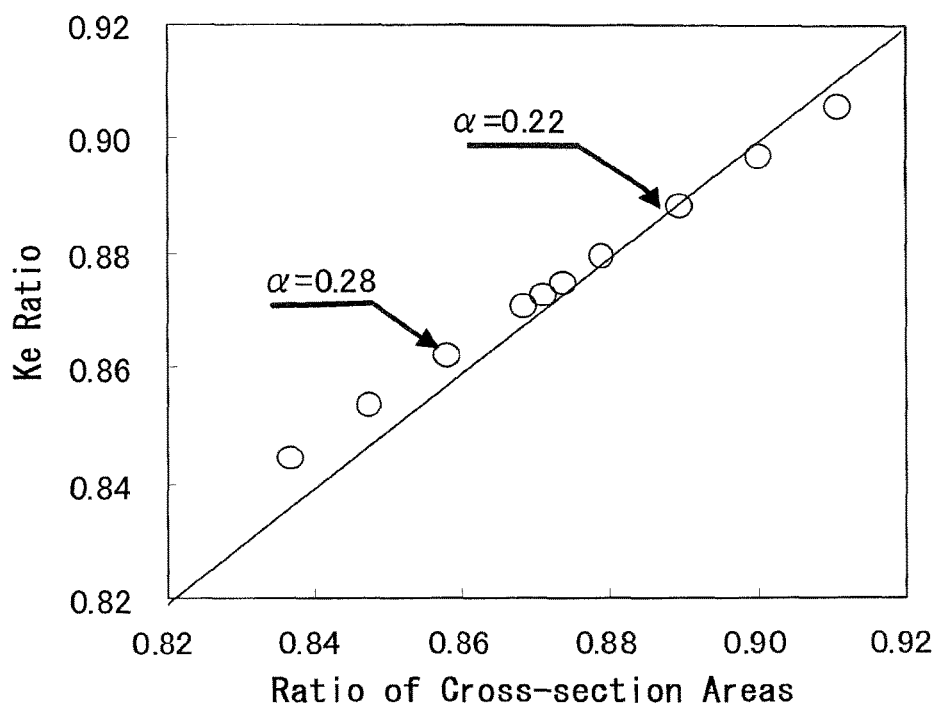
FIG. 5 is a characteristics graph illustrating a ratio of a cross-section area of the magnetic poles and a ratio of the back-EMF constant Ke.
Figure 6A:
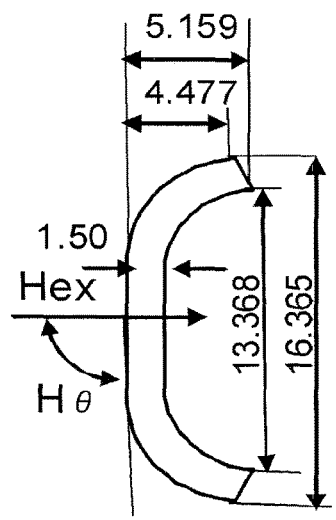
FIG. 6A is a schematic view of parallel oriented annular magnetic poles which control the anisotropy in a continuous direction.
Figure 6B:
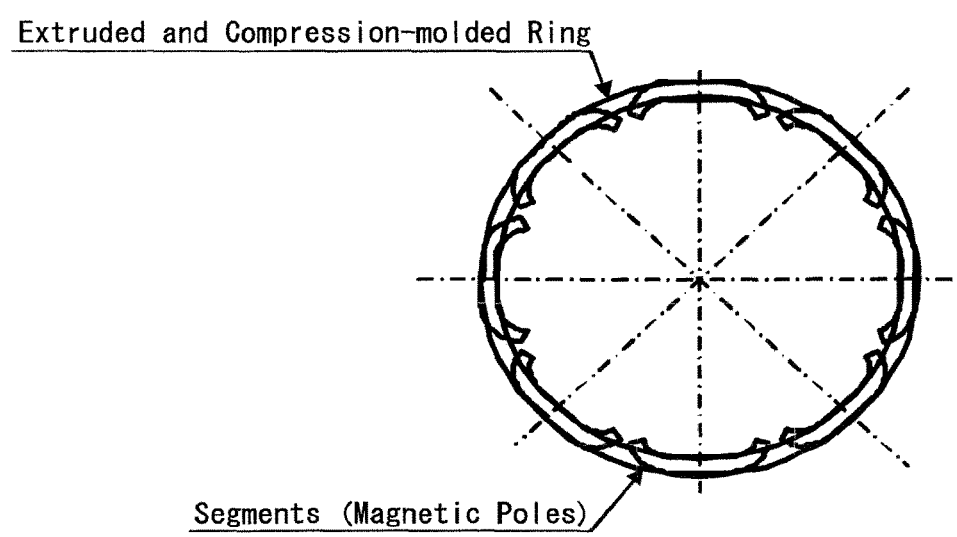
FIG. 6B is a cross-section view in a direction orthogonal to the axial direction of a ring magnet.
Figure 7:
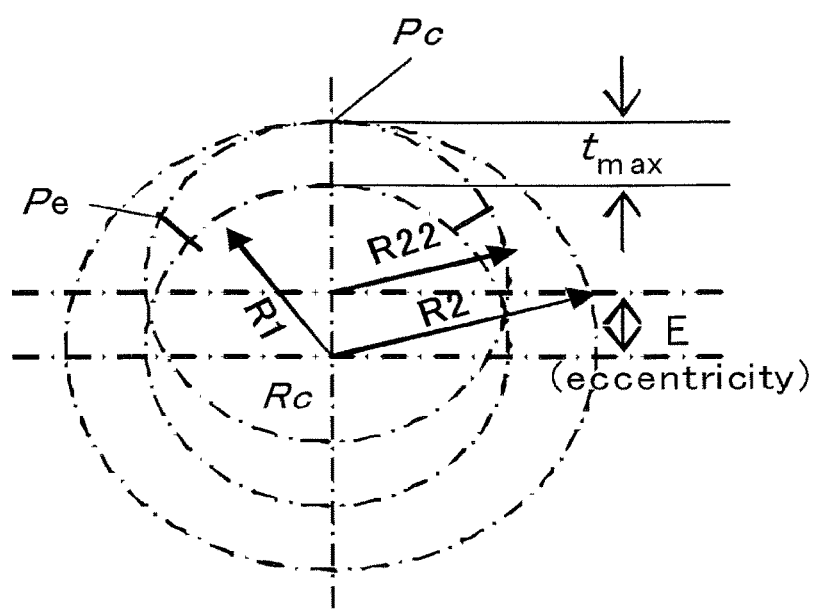
FIG. 7 is a cross-section view in a direction orthogonal to the axial direction of circular arc-shaped magnetic poles showing an eccentricity rate E.

FIG. 5 illustrates a ratio of a cross-section area of the magnetic poles and a ratio of the back-EMF constant Ke in the embodiment of the present invention. A reduction ratio used herein means a ratio with α=0 (non-eccentric magnetic poles), and when α=0 (non-eccentric magnetic poles), the magnetic pole cross-section area was 30.597 mm² (density of 6.0 Mg/m³), and Ke was 15.96 mVs/rad. The diagonal line in FIG. 5 represents a case that the reduction of the magnetic pole cross-section area and the reduction of the back-EMF constant Ke are equivalent. As is clear from FIG. 5, when the coefficient α is in the range 0.25±0.03 as in the present invention, the reduction of Ke does not exceed the reduction of the magnetic pole cross-section area.

What is claimed is:

1. A manufacturing method of an inner rotor-type permanent magnet motor, comprising:
   providing a plurality of parallel oriented annular magnetic poles P each having:
      a remanence Mr of 0.9 T or more,
      a coercivity HcJ of 0.80 MA/m or more,
      a maximum energy product $(BH)_{max}$ of 150 kJ/m³ or more,
      a center point Pc along a direction configured to be a circumferential direction of a rotor outer circumferential surface, and
      a maximum thickness $t_{max}$ at center point Pc,
      wherein when a straight line connecting the center point Pc and a rotational axis center Rc is Pc-Rc, a circumferential direction magnetic pole end of the rotor outer circumferential surface is P'e, an arbitrary point in the circumferential direction is Px, the arbitrary point Px being on a line extending from the pole end P'e non-eccentrically drawn relative to the rotational axis center Rc, a straight line connecting the arbitrary point Px and the rotational axis center Rc is Px-Rc, an apex angle of the straight lines Pc-Rc and Px-Rc is θ, a number of pole pairs is Pn, a position on the rotor outer circumferential surface extending from the arbitrary point Px parallel to the straight line Pc-Rc is P'x, a circumferential direction magnetic pole end is Pe, the pole end Pe being on a line extending from the center point Pc non-eccentrically drawn relative to the rotational axis center Rc, and a magnetic pole end biasing distance $\Delta L_{Pe}$ defined between the pole end Pe and the pole end P'e is $\alpha \times t_{max}$ (α is a coefficient): α is 0.25±0.03, and a magnetic pole end biasing distance $\Delta L_{px}$ defined between the position P'x and the point Px on the straight line Px-Rc relative to the apex angle θ is $\Delta L_{pe} \times \cos(\theta \times Pn)$,
   each of the parallel oriented annular magnetic poles P being formed in a state of being orthogonal to a direction of a uniform external magnetic field Hex;
   arranging each of the magnetic poles P uniformly in a first circumferential direction in accordance with a number of pole pairs Pn;
   transferring each of the magnetic poles P into an annular cavity while heating from one axial direction end surface;
   recompressing each of the magnetic poles P so as to combine each circumferential direction magnetic pole end P'e of the magnetic poles P with each other to form a ring-shaped parallel orientated annular magnetic pole Pr;

inserting the ring-shaped parallel orientated annular magnetic pole Pr into a core with a rotation shaft; and adhesively fixing the ring-shaped parallel orientated annular magnetic pole Pr to the core to form an inner rotor.

2. The manufacturing method of the inner rotor-type permanent magnet motor according to claim 1, wherein the motor has 4 poles and 6 slots.

3. The manufacturing method of the inner rotor-type permanent magnet motor according to claim 1, wherein the straight line Pc-Rc is 25 mm or less.

* * * * *